(12) United States Patent
Huang (10) Patent No.: US 7,277,579 B2
(45) Date of Patent: Oct. 2, 2007

(54) SMART SCAN

(75) Inventor: Hua Huang, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 891 days.

(21) Appl. No.: 10/159,707

(22) Filed: May 31, 2002

(65) Prior Publication Data

US 2003/0231803 A1   Dec. 18, 2003

(51) Int. Cl.
*G06K 9/34* (2006.01)

(52) U.S. Cl. .................................. 382/173; 382/175

(58) Field of Classification Search ................. 382/175
See application file for complete search history.

(56) References Cited

U.S. PATENT DOCUMENTS

| | | | | |
|---|---|---|---|---|
| 4,623,935 A | * | 11/1986 | Mukai et al. | 358/464 |
| 5,023,923 A | * | 6/1991 | Sanner et al. | 382/175 |
| 5,345,313 A | * | 9/1994 | Blank | 348/598 |
| 5,448,692 A | * | 9/1995 | Ohta | 715/520 |
| 6,271,890 B1 | * | 8/2001 | Tamir et al. | 348/587 |
| 6,453,069 B1 | * | 9/2002 | Matsugu et al. | 382/173 |
| 6,766,054 B1 | * | 7/2004 | Christensen et al. | 382/173 |
| 6,766,055 B2 | * | 7/2004 | Matsugu et al. | 382/173 |
| 6,801,654 B2 | * | 10/2004 | Nakamura et al. | 382/154 |

\* cited by examiner

*Primary Examiner*—Wenpeng Chen
*Assistant Examiner*—Yuzhen Ge
(74) *Attorney, Agent, or Firm*—Patent Law Group LLP; David C. Hsia

(57) ABSTRACT

A method for determining a border of an image includes (a) receiving a composite image including a background image and a foreground image, (b) following one geometric feature (e.g., a line) of the background image, and (c) detecting two or more breakpoints in the first geometric feature where the foreground image superimposes the geometric feature. Actions (b) and (c) are repeated to detect breakpoints for a number of the geometric features. The border of the foreground image is determined by constructing linear edges that each connects three or more breakpoints and extending the linear edges until each intersect with two other linear edges to form the border of the foreground image.

An apparatus for determining a border of an image includes a scanner and a document cover. The document cover includes a blue backdrop and geometric features. The geometric features include green vertical and horizontal lines.

16 Claims, 8 Drawing Sheets

SMART SCAN

FIELD OF INVENTION

The invention relates to image processing, and more specifically to a method and an apparatus for detecting the border of a foreground image from a background image in a scanned image.

DESCRIPTION OF RELATED ART

A scanner typically produces a scanned image that includes a desired foreground image and a background image consisting of white space that surrounds the desired foreground image. This is because the scanner is made to scan a relatively large area to accommodate a variety of image sizes. Thus, the user typically uses a graphics program to crop the unwanted white space. This involves the user manually designating the border of the desired foreground image using an input device such as a mouse, and the graphics program removing white space outside of the border. The manual cropping process is slow, dull, and repetitive. Thus, what are needed are a method and an apparatus that automatically detect the border of a desired foreground image from an unwanted background image in a scanned image.

SUMMARY

In embodiments of the invention, a method for determining a border of an image includes (a) receiving a composite image including a background image and a foreground image, (b) following one geometric feature (e.g., a line) of the background image, and (c) detecting two or more breakpoints in the first geometric feature where the foreground image superimposes the geometric feature. Actions (b) and (c) are repeated to detect breakpoints for a number of the geometric features. The border of the foreground image is determined by constructing linear edges that each connects at least three of the breakpoints and extending the linear edges until each intersects with two other linear edges to form the border of the foreground image.

A computer can perform the method described above to accurately determine the border a desired image that is part of a scanned image. After the border of the desired image is determined, the computer can crop and save the desired image independently from the scanned image. Thus, the manual cropping process is avoided.

In embodiments of the invention, an apparatus for determining a border of an image includes a scanner and a document cover. The document cover includes a pattern with a backdrop and a plurality of geometric features. The geometric features include vertical lines. The geometric features may also include horizontal lines. The backdrop can be blue and the vertical and the horizontal lines can be green.

A computer can use the apparatus described above to perform the previously described method. The document cover provides an appropriate background image against which a desired foreground image can be scanned against to determine the border of the desired foreground image.

DETAILED DESCRIPTION

Figure 1:
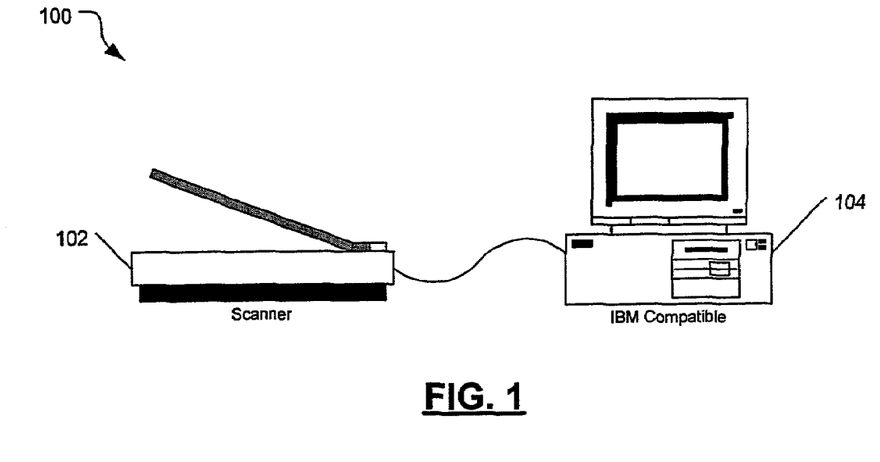
FIG. 1 shows a system for detecting the border of a foreground image from a background image in a scanned image in accordance with embodiments of the invention.

FIG. 1 shows a system 100 for detecting the border of a desired image, such as a photograph or a document, in a scanned image according to embodiments of the invention. System 100 includes a scanner 102 coupled to a computer 104. Scanner 102 scans an image and provides a graphic file of the image to computer 104.

Figure 2:
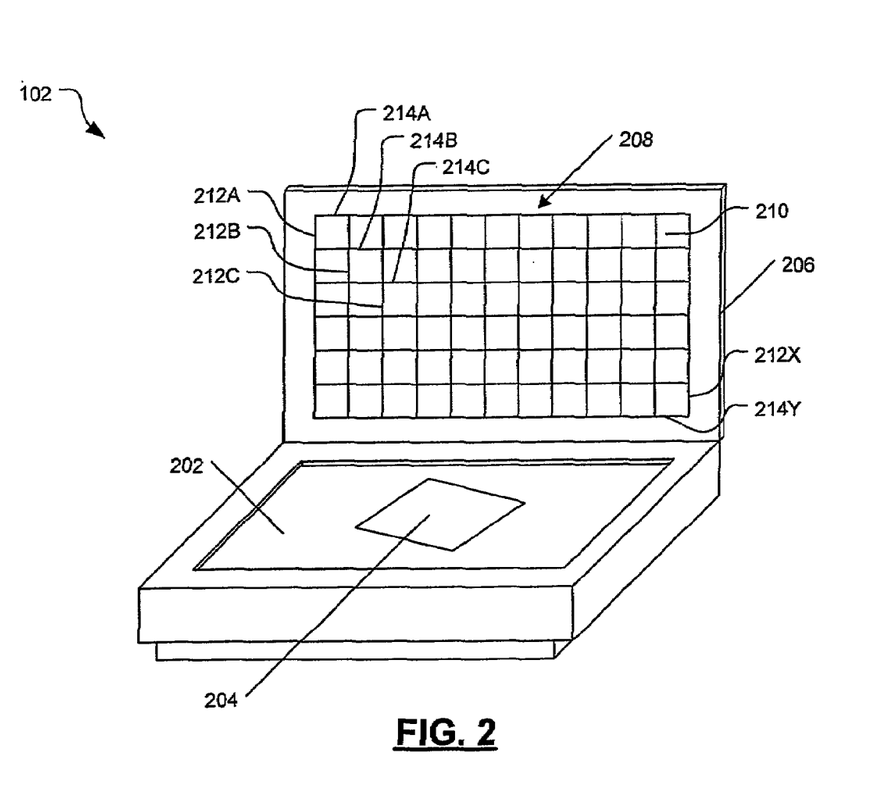
FIG. 2 shows a scanner of the system of FIG. 1 in one embodiment.

FIG. 2 shows one embodiment of scanner 102. Scanner 102 includes a document table 202 where an image 204 is placed to be scanned. A document cover 206 is closed over document table 202 to provide a background for image 204 during scanning. Document cover 206 includes a background pattern 208. Pattern 208 helps to detect the border of image 204 in a method 300 (FIGS. 3-5) described later. One embodiment of pattern 208 includes a blue backdrop 210 with geometric features. The geometric features include green vertical lines 212A, 212B, 212C, . . . , 212X and horizontal lines 214A, 214B, 214C, . . . , 214Y. The density of the vertical and horizontal lines can be varied.

After scanning, scanner 102 produces a graphics file of a composite image 600 (FIG. 6) including a portion of pattern 208 as a background image and image 204 as a foreground image. Computer 104 receives the graphics file and performs method 300 to detect the border of image 204. Once computer 104 detects the border of image 204, computer 104 can crop and save image 204 independently from composite image 600.

Figure 3:
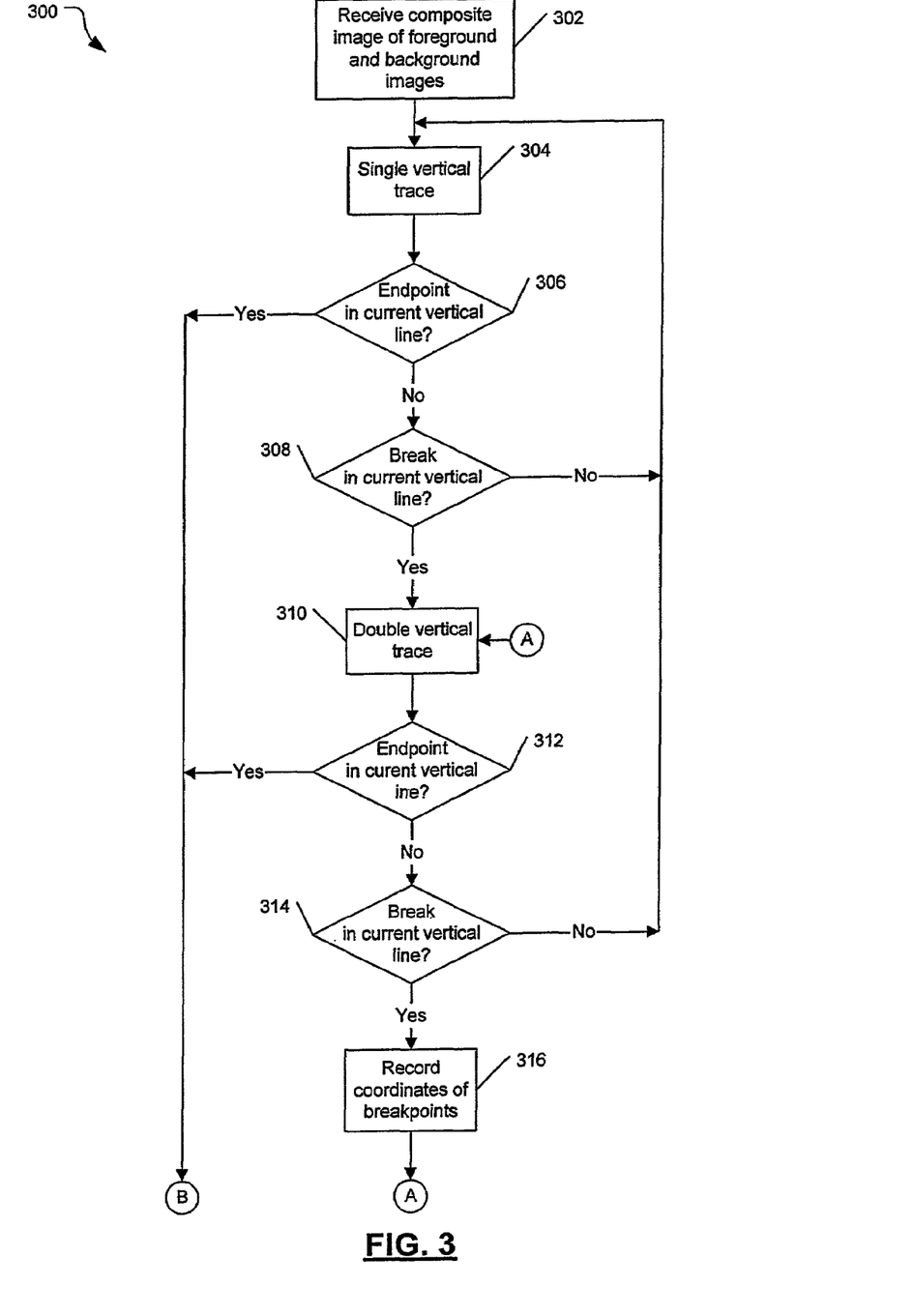
FIGS. 3, 4, and 5 show a method for detecting the border of a foreground image from a background image in a scanned image in accordance with embodiments of the invention.
Figure 4:
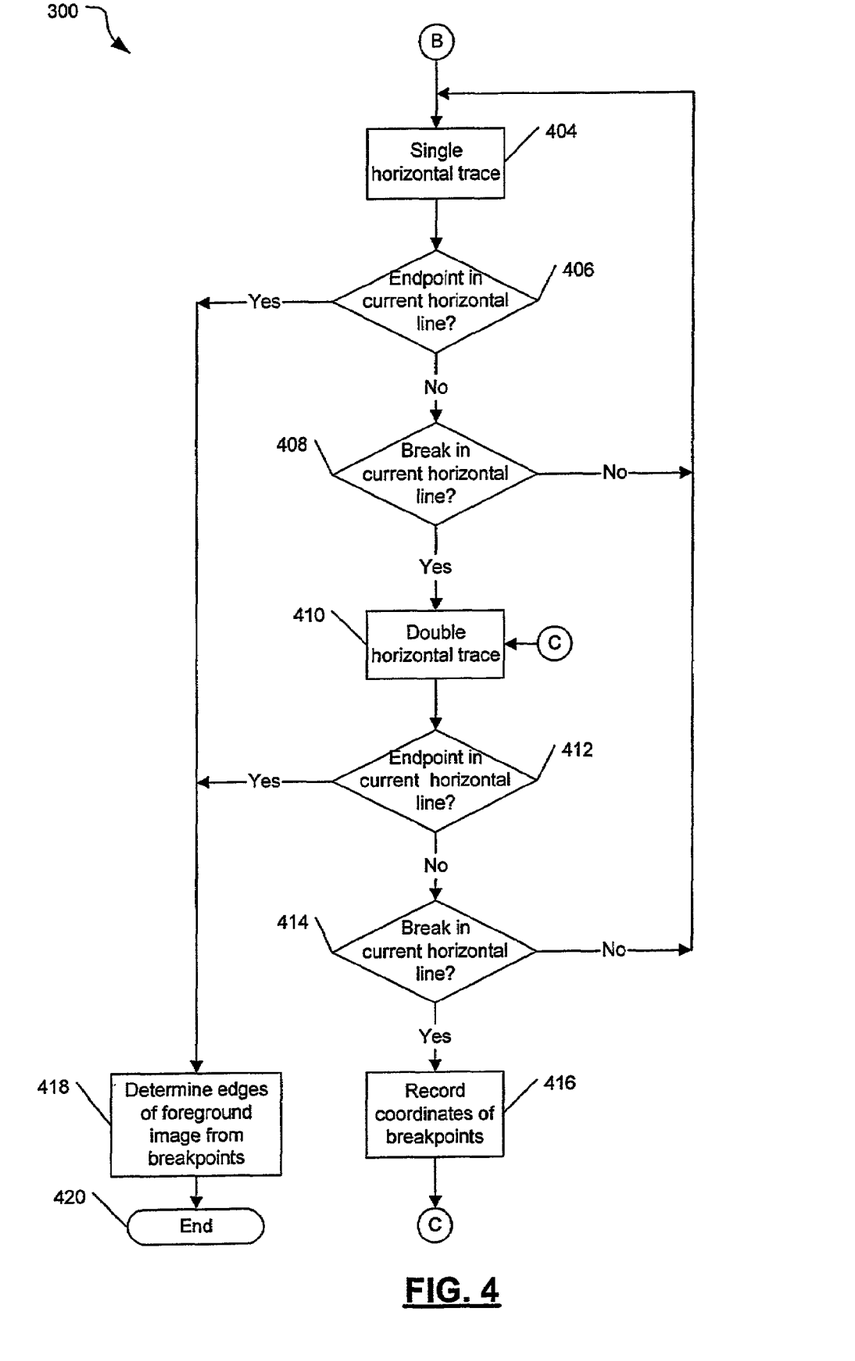
Figure 5:
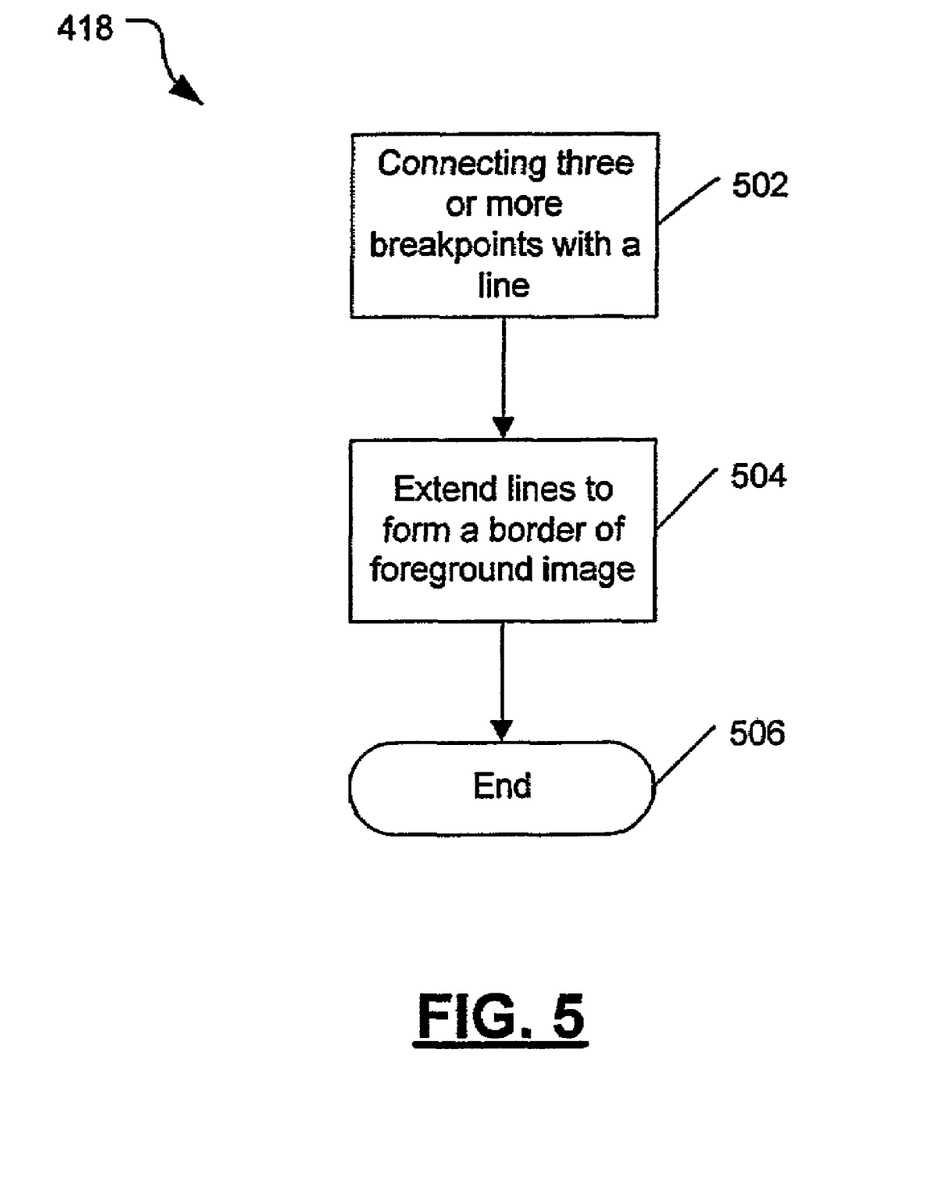
Figure 6:
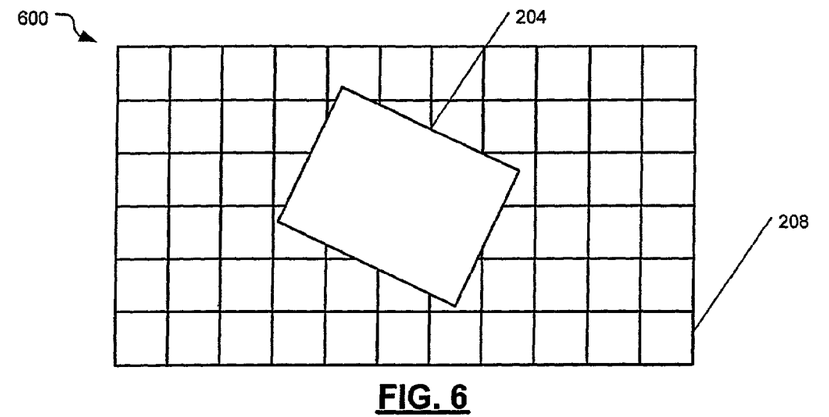
FIG. 6 shows a scanned image including a foreground image and a background image in one embodiment.

FIGS. 3, 4, and 5 show method 300 in embodiments of the invention. Method 300 includes two main parts. In a first part including actions 302 to 316 (FIG. 3), computer 104 detects where image 204 breaks or interrupts the vertical lines of pattern 208 in composite image 600 (FIG. 6). Image 204 breaks a line when a portion of image 204 superimposes over the line. In a second part including actions 404 to 416 (FIG. 4), computer 104 detects where image 204 breaks the horizontal lines of pattern 208. Computer 104 then determines the border of image 204 from the points where the vertical and horizontal lines are broken by image 204 (hereafter "breakpoints").

In action 302 (FIG. 3), computer 104 receives composite image 600 (FIG. 6) from scanner 102. As previously described, composite image 600 includes a foreground image of image 204 and a background image of pattern 208.

In action 304, computer 104 detects and follows a vertical line of pattern 208 (hereafter a "current vertical line") to determine if there is a break in the current vertical line. Detecting and tracing lines in an image are conventional and within the skills of one in the art. Various conventional algorithms may be used to detect and trace lines. Computer 104 attempts to follow each vertical line of pattern 208 using a single vertical trace pattern 606 shown in FIG. 7 in one embodiment.

Figure 7:
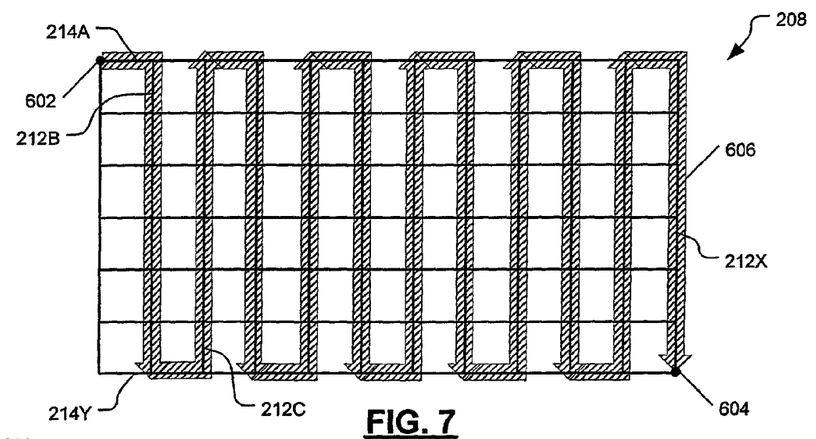
FIG. 7 shows a vertical trace pattern on the scanned image of FIG. 6 that follows the vertical lines of the background image to detect the border of the foreground image.

Trace pattern 606 begins at, e.g., the upper left corner of pattern 208 at a start point 602 and ends at, e.g., a lower right corner of pattern 208 at an endpoint 604. Start point 602 is the intersection between the first vertical line 212A and the first horizontal line 214A of pattern 208, and endpoint 604 is the intersection between the last vertical line 212X and the last horizontal line 214Y of pattern 208.

Trace pattern 606 begins by following the first horizontal line 214A to the right until it intersects the second vertical line 212B. Trace pattern 606 then follows the second vertical line 212B down until it intersects the last horizontal line 214Y. Trace pattern 606 then follows the last horizontal line 214Y to the right until it intersects the third vertical line 212C. Trace pattern 606 then follows the third vertical line 212C up until it intersects the first horizontal line 214A. Trace pattern 606 repeats the above-described path until it reaches endpoint 604.

In action 306 (FIG. 3), computer 104 determines if it has detected endpoint 604 while following the current vertical line. Computer 104 detects endpoint 604 when it has completely traversed composite image 600 using trace pattern 606. If computer 104 has detected endpoint 604, then action 306 is followed by action 404 (FIG. 4). Otherwise, action 306 is followed by action 308.

Figure 8:
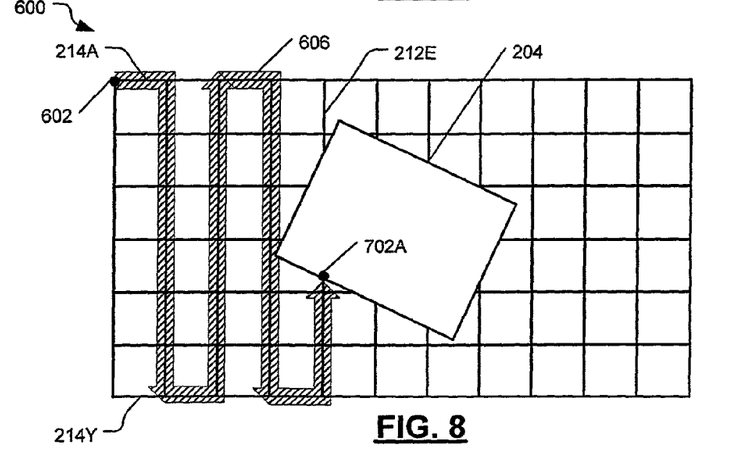
FIGS. 8, 9, and 10 show multiple breakpoints of the vertical lines of the background image where the foreground image superimposes over the vertical lines.

In action 308, computer 104 determines if it has detected a break in the current vertical line while following the current vertical line. Computer 104 detects a break in the current vertical line when image 204 superimposes over the current vertical line at the location of the break. FIG. 8 shows a graphical representation of when computer 104 detects a break (shown as breakpoint 702A) in a vertical line 212E of pattern 208. If computer 104 has detected a break, then action 308 is followed by action 310. Otherwise, action 308 is followed by action 304 and computer 104 follows a subsequent vertical line using single vertical trace pattern 606.

Computer 104 detects a break in the current vertical line when the color value of one or more pixels at the expected location of the vertical line is different from the color value of the pixels of the vertical line (e.g., green). If the color values are different, then that pixel belongs to image 204 instead of the current vertical line of pattern 208. Computer 104 then saves the location of that pixel to demarcate a breakpoint that forms a part of the border of image 204. Detecting a break in the line is conventional and within the skills of one in the art. Various conventional algorithms may be used to detect breaks in the line.

Figure 9:
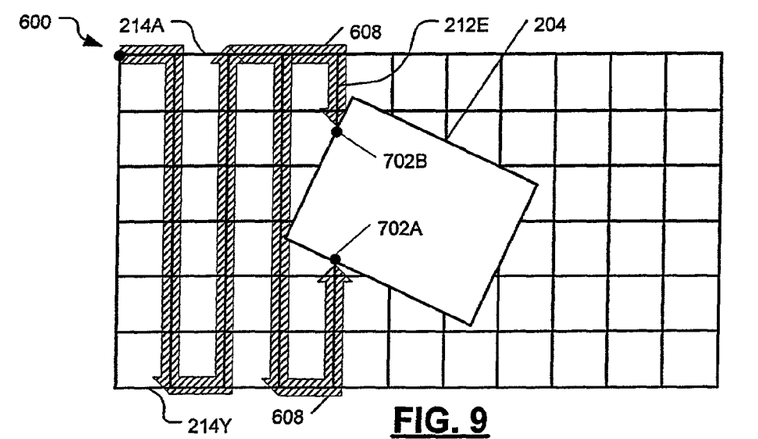

In action 310, computer 104 follows the current vertical line from both directions using a double vertical trace pattern 608 (FIG. 9). In other words, computer 104 follows the current vertical line both downward from the first horizontal vertical line 214A and upward from the last horizontal line 214Y. FIG. 9 shows a graphical representation of when computer 104 performs the vertical trace of the current vertical line 212E from both directions.

In action 312 (FIG. 3), computer 102 determines if it has detected endpoint 604 while following the current vertical line in both directions. Computer 104 detects endpoint 604 when it has completely traversed composite image 600 using trace pattern 608 (usually after the first double vertical trace). If computer 104 has detected endpoint 604, then action 312 is followed by action 404 (FIG. 4). Otherwise, action 312 is followed by action 314.

In action 314, computer 104 determines if it has detected two or more breakpoints while following the current vertical line in both directions. Computer 104 detects two or more breakpoints when a portion of image 204 superimposes over the current vertical line at the locations of the breaks. FIG. 9 shows when computer 104 detects two breakpoints 702A and 702B where vertical line 212E is superimposed by image 204. Computer 104 may continue to follow along the current vertical line in both directions until it converges at the midpoint of the current vertical line. Alternatively, computer 104 may stop after it detects only two breakpoints if image 204 is generally obtuse in shape so any vertical line of pattern 208 does not cross more than two edges of the border of pattern 208.

If computer 104 has detected two or more breakpoints in the current vertical line, action 314 is followed by action 316. Otherwise, action 314 is followed by action 304 and computer 104 returns to following a subsequent vertical line using single vertical trace pattern 606 (FIG. 7).

Figure 10:
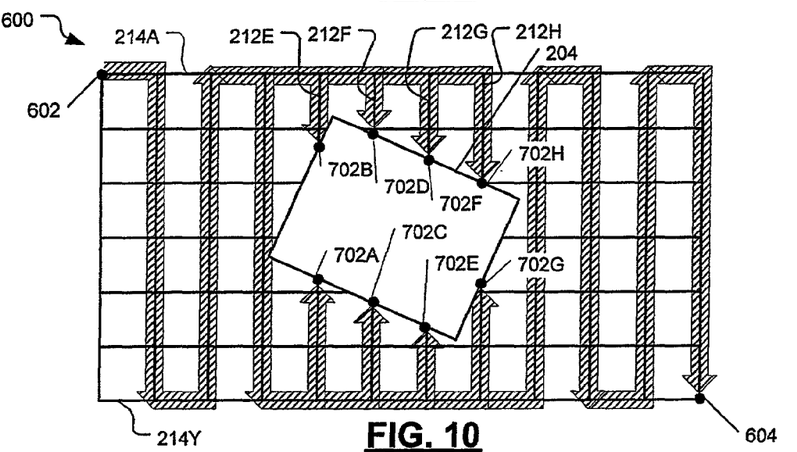

In action 316 (FIG. 3), computer 104 saves the coordinates of the two or more breakpoints to be used later to determine the border of image 204. Action 316 is followed by action 310 and computer 104 follows a subsequent vertical line using double vertical trace pattern 608 (FIG. 9). FIG. 10 shows a graphical representation of when computer 104 has detected pairs of breakpoints for the vertical lines of pattern 208 using double vertical trace discussed above. For example, computer 104 has detected breakpoints 702A and 702B for a fifth vertical line 212E, breakpoints 702C and 702D for a sixth vertical line 212F, breakpoints 702E and 702F for a seventh vertical line 212G, and breakpoints 702G and 702H for an eighth vertical line 212H.

In action 404 (FIG. 4), computer 104 follows a horizontal line of pattern 208 (hereafter a "current horizontal line") to determine if there is a break in the current horizontal line. Computer 104 attempts to follow each horizontal line of pattern 208 using a single horizontal trace pattern 1006 shown in FIG. 11 in one embodiment. Horizontal trace 1006 begins at start point 602 and terminates at endpoint 604.

Figure 11:
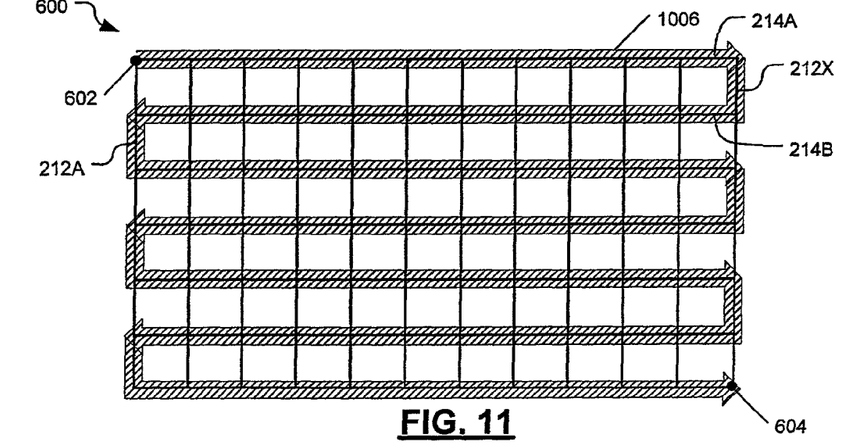
FIG. 11 shows a horizontal trace pattern on the scanned image of FIG. 6 that follows the horizontal lines of the background image to detect the border of the foreground image.

Trace pattern 1006 travels to the right along the first horizontal line 214A until it intersects the last vertical line 212X of grid pattern 208. Then trace pattern 1006 travels down along the last vertical line 212X until it intersects the second horizontal line 214B of grid pattern 208. Trace pattern 1006 then travels left along the second horizontal line 214B until it intersects the first vertical line 212A of grid pattern 208. Trace pattern 1006 then travels downward along the first vertical line 212A until it intersects the third horizontal line 214C. Trace pattern 1006 repeats the above pattern until it reaches endpoint 604.

In action 406 (FIG. 4), computer 104 determines if it has detected endpoint 604 while following the current horizontal line. Similar to action 306 described above, computer 104 detects endpoint 604 when it completely traverses composite image 600. If computer 104 has detected endpoint 604, then action 406 is followed by action 418 where computer 104 determines the border of image 204. Otherwise, action 406 is followed by action 408.

Figure 12:
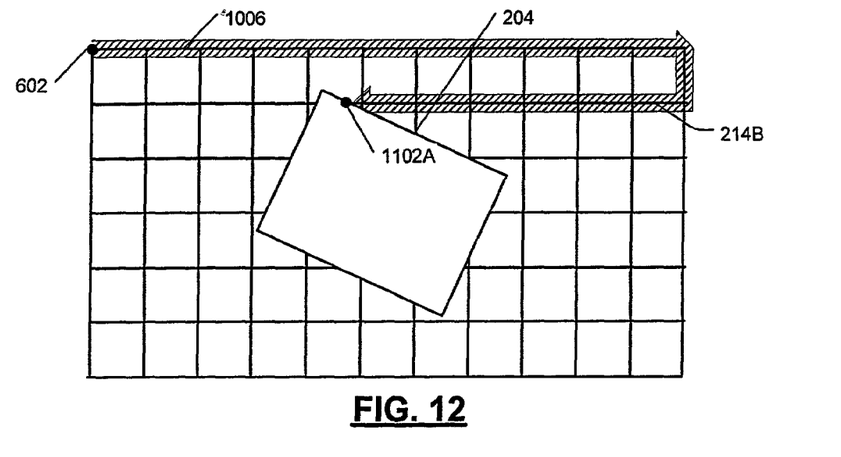
FIGS. 12 and 13 show multiple breakpoints of the horizontal lines of the background image where the foreground image superimposes over the horizontal lines.

In action 408, computer 104 determines if it has detected a break in the current horizontal line while following the current horizontal line. Similar to action 308 described above, computer 104 detects a break in the current horizontal line when image 204 superimposes over the current horizontal line at the location of the break. FIG. 12 shows a graphical representation of when computer 104 detects a break (shown as breakpoint 1102A) in a horizontal line 214B of grid pattern 208. If computer 104 has detected a break, then action 408 is followed by action 410. Otherwise, action 408 is followed by action 404 and computer 104 follows a subsequent vertical line using single horizontal trace pattern 1006.

Figure 13:
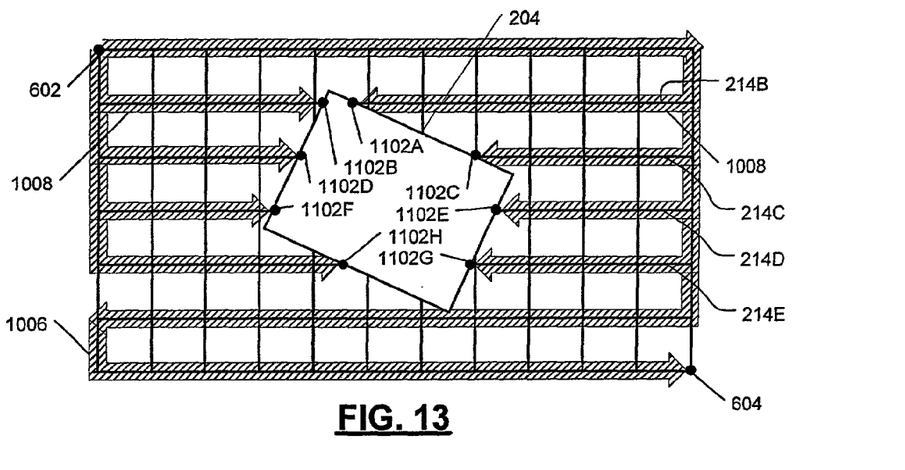

In action 410, computer 104 follows the current vertical line from both directions using a double horizontal trace pattern 1008 (FIG. 13). In other words, computer 104 follows the current horizontal line both to the right from the first vertical line 212A and to the left from the last vertical line 212X. FIG. 13 shows a graphical representation of when computer 104 detects two breakpoints 1102A and 1102B where a horizontal line 214B is superimposed by image 204.

In action 412 (FIG. 4), computer 104 determines if it has detected endpoint 604 while following the current horizontal line in both directions. Similar to action 312 described above, computer 104 detects endpoint 604 when it has completely traversed composite image 600 using trace pattern 1008 (usually after the first double horizontal trace). If computer 104 has detected endpoint 604, then action 412 is followed by action 418 where computer 104 determines the border of image 204 from the detected breakpoints. Otherwise action 412 is followed by action 414.

In action 414, computer 104 determines if it has detected two or more breakpoints while following along the current horizontal line in both directions. If computer 104 has detected two or more breakpoints, then action 414 is followed by action 416. Otherwise, action 414 is followed by action 404 and computer 104 returns to following a subsequent horizontal line using single horizontal trace pattern 1006 (FIG. 11). Similar to action 314 described above, in action 414, computer 104 may continue to follow along the current horizontal line in both directions until it converges at the midpoint of the current horizontal line.

In action 416, computer 104 saves the coordinates of the two or more breakpoints. Action 416 is followed by action 410 and computer 104 follows a subsequent horizontal line using double horizontal trace pattern 1008 (FIG. 13). FIG. 13 shows a graphical representation of when computer 104 has detected pairs of breakpoints for the horizontal lines of pattern 208 using the double horizontal trace discussed above. For example, computer has detected breakpoints 1102A and 1102B for a second horizontal line 214B, breakpoints 1102C and 1102D for a third horizontal line 214C, breakpoints 1 102E and 1 102F for a fourth horizontal line 214D, and breakpoints 1102H and 1102G for a fifth horizontal line 214E.

In action 418, computer 104 determines the border of image 204. Action 418 is described later in reference to FIG. 5. Action 418 is followed by action 420.

In action 420, computer 104 crop composite image 600 around the determined border to remove background image of pattern 208 from the foreground image of image 204. Action 420 is followed by action 422, which ends method 300.

Figure 14:
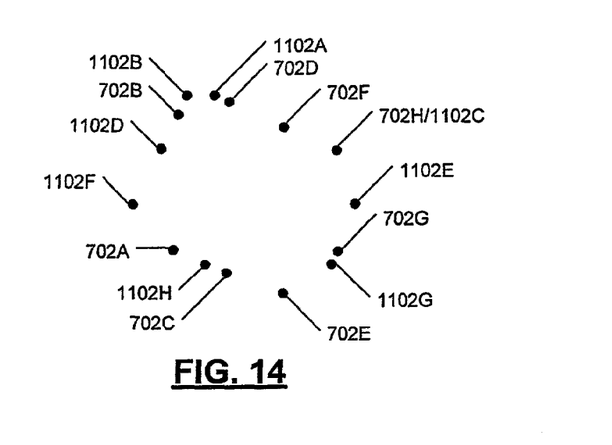
FIG. 14 shows the multiple break points of both the vertical and the horizontal lines of the background image in FIGS. 10 and 13.

FIG. 5 shows one embodiment of action 418 where the coordinates of the detected breakpoints are used to determine the border of image 204. Exemplary breakpoints determined by method 300 are shown in FIG. 14.

Figure 15:
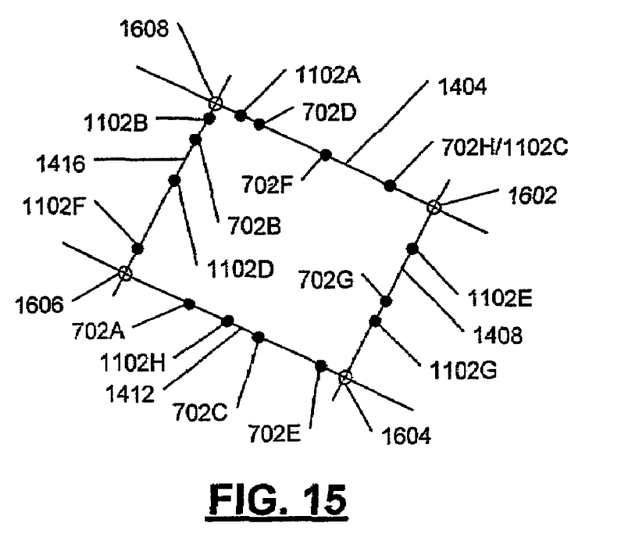
FIG. 15 shows the multiple break points of FIG. 14 connected by lines to form the border of the foreground image.

In action 502 (FIG. 15), computer 104 constructs lines (e.g., linear edges) that connect three or more breakpoints. FIG. 15 shows a graphical representation of various lines that connect three or more breakpoints. Table 1 shows the reference numerals for each line and the breakpoints they connect.

TABLE 1

| Line | Breakpoints |
| --- | --- |
| 1404 | 1102A, 702D, 702F, 702H/1102C |
| 1408 | 1102E, 702G. 1102G |
| 1412 | 702E, 702C, 1102H, 702A |
| 1416 | 1102F, 1102D, 702B, 1102B |

In action 504, computer 104 extends each of lines 1404, 1408, 1412, and 1416 until they intersect two other lines. For example, line 1404 is extended until (1) it intersects line 1416 at point 1608, and (2) it intersects line 1408 at point 1602. Similarly, line 1412 is extended until (1) it intersects line 1416 at point 1606, and (2) it intersects line 1408 at points 1604. The extended lines 1404, 1408, 1412, and 1416 thus form the border of image 204. Action 504 is followed by action 506, which ends action 418.

Figure 16:
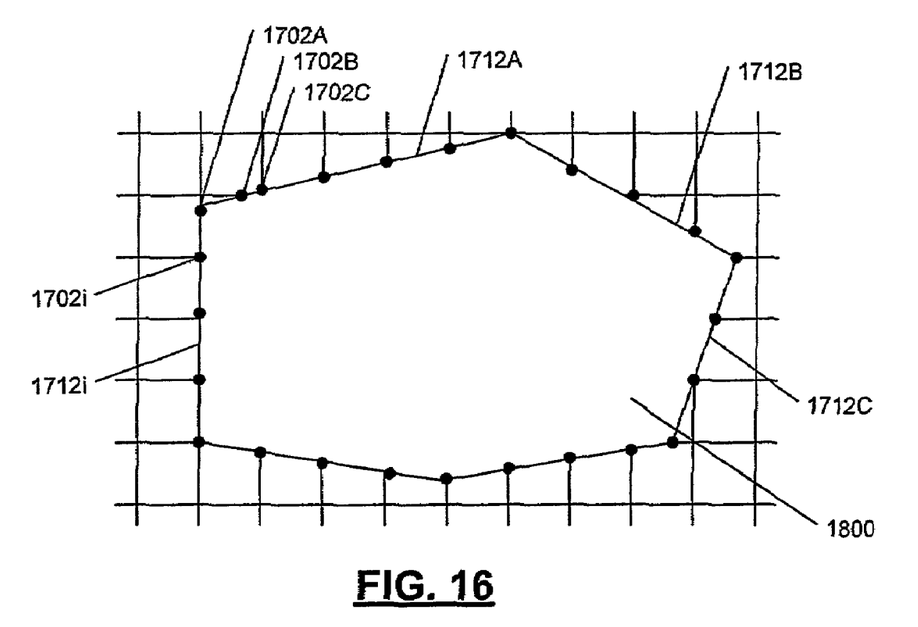
FIG. 16 shows multiple break points connected by lines to form the border of a non-rectangular foreground image.

FIG. 16 shows a graphical representation of when computer 104 applies method 300 to a non-rectangular shape 1800. Computer 104 detects various breakpoints 1702A, 1702B, 1702C, . . . , 1702$i$ along the border of shape 1800. Computer 104 then extends lines 1712A, 1712B, 1712C, . . . , 1712$i$ through at least three of such breakpoints until lines intersect. These lines would form the border of shape 1800.

Various other adaptations and combinations of features of the embodiments disclosed are within the scope of the invention. For example, only a vertical or a horizontal trace is needed if the density of the lines is great enough to generate sufficient number of breakpoints to delineate the border of image 204. Instead of vertical and horizontal lines of a single color, the lines can be made of pixels of different colors (e.g., a line consisting of red, black, and yellow pixels) so they are more easily traced and differentiated from image 204. Other background patterns, such as an oscillating pattern, can be used instead of the rectilinear pattern 208 disclosed. Document cover 206 may be a separate component from scanner 102 that provides a background against which image 204 is scanned. For example, the scanner can be a handheld scanner and the document cover is simply a platform where the document is placed and scanned by the handheld scanner. Although a scanner is mentioned in various embodiments, other peripheral devices can be used to input a composite image to a computer for border detection. For example, a digital camera may be used to capture a desired foreground image 204 placed on a document cover 206. Numerous embodiments are encompassed by the following claims.

I claim:

1. A method for determining a border of an image, comprising:
   (a) receiving a composite image of said image against a document cover of a scanner, said document cover comprising a geometric feature;

(b) following said geometric feature of said document cover in said composite image, wherein said geometric feature comprises a line in said document cover;
(c) detecting at least two breakpoints in said geometric feature where said image superimposes said geometric feature;
(d) repeating actions (b) to (c) to detect a plurality of breakpoints of a plurality of geometric features; and
(e) determining a border of said image from coordinates of said first plurality of breakpoints.

2. The method of claim 1, wherein said determining a border of said image comprises constructing linear edges that each connects at least three of said plurality of breakpoints.

3. The method of claim 2, wherein said determining a border of said image further comprises extending said linear edges until each intersects with two other linear edges to form said border.

4. The method of claim 1, wherein said document cover comprises a backdrop of a first color and said geometric feature of a second color.

5. The method of claim 4, wherein said plurality of geometric features comprises more than four vertical lines.

6. The method of claim 4, wherein said first color is blue and said second color is green.

7. The method of claim 5, wherein said following a geometric feature comprises following a vertical line in both an upward direction and a downward direction.

8. The method of claim 1, wherein said detecting at least two breakpoints comprises detecting a change in color value of a pixel while following said geometric feature.

9. A method for determining a border of an image, comprising:
(a) receiving a composite image of said image against a document cover of a scanner, said document cover comprising vertical and horizontal lines;
(b) following said vertical lines of said document cover in said composite image;
(c) detecting a first plurality of breakpoints in said vertical lines where said image superimposes said vertical lines;
(d) following said horizontal lines of said document cover in said composite image;
(e) detecting a second plurality of breakpoints in said horizontal lines where said image superimposes said horizontal lines; and
(f) determining a border of said image from coordinates of said first and said second pluralities of breakpoints.

10. The method of claim 9, wherein said determining a border of said image comprises constructing linear edges that each connects at least three breakpoints from said first and said second pluralities of breakpoints.

11. The method of claim 10, wherein said determining a border of said image further comprises extending said linear edges until each intersects with two other linear edges to form said border.

12. The method of claim 9, wherein said document cover comprises a backdrop of a first color, said vertical lines of a second color, and said horizontal lines of said second color.

13. The method of claim 12, wherein said first color is blue and said second color is green.

14. The method of claim 12, wherein said following vertical lines comprises following each vertical line in both an upward direction and a downward direction, and said following horizontal lines comprises following each horizontal line in both a rightward direction and a leftward direction.

15. The method of claim 9, wherein said detecting a first plurality of breakpoints and said detecting a second plurality of breakpoints each comprises detecting a change in color value of a pixel while following a respective line.

16. The method of claim 9, wherein the document cover comprises more than four vertical lines and more than four horizontal lines.

\* \* \* \* \*